United States Patent [19]
Melguen

[11] Patent Number: 5,141,442
[45] Date of Patent: Aug. 25, 1992

[54] APPARATUS AND DIDACTIC METHOD FOR TEACHING AND SHOWING PRIMARY ORBITAL PHENOMENA AND VARIOUS MOVEMENTS

[76] Inventor: Bernard Melguen, La Bossoniere; La Paquelais, 44360 Saint Etienne de Montluc, France

[21] Appl. No.: 582,971
[22] PCT Filed: Nov. 30, 1989
[86] PCT No.: PCT/FR89/00623
§ 371 Date: Oct. 1, 1990
§ 102(e) Date: Oct. 1, 1990
[87] PCT Pub. No.: WO90/06569
PCT Pub. Date: Jun. 14, 1990

[30] Foreign Application Priority Data
Dec. 2, 1988 [FR] France .................. 88 15869

[51] Int. Cl.⁵ .......................... G09B 27/06
[52] U.S. Cl. ................................ 434/287
[58] Field of Search ........... 434/287, 288, 291

[56] References Cited
U.S. PATENT DOCUMENTS

| | | | |
|---|---|---|---|
| 263,886 | 9/1882 | Fitz | 434/287 |
| 506,084 | 10/1893 | Turnbull | 434/287 |
| 1,019,405 | 3/1912 | Atwood | 434/287 |
| 1,853,059 | 4/1932 | Johnson | 434/287 |
| 3,088,228 | 5/1963 | Eisenhauer | 434/287 |

FOREIGN PATENT DOCUMENTS
1-257892 10/1989 Japan ..................... 434/287
3839680 5/1990 Netherlands ............. 434/287

Primary Examiner—Richard J. Apley
Assistant Examiner—Karen Ann Richard
Attorney, Agent, or Firm—Browdy and Neimark

[57] ABSTRACT

The invention is directed to an apparatus for representing orbital phenomena. It comprises a sphere (20) pivoting about an inclined axis (8) on bearings (38, 60) integral with a support ring (23) mounted adjustable in a slide (26) and locked in the selected position by means of a screw (28), of a local horizon disc (1) pivoting on bearings of the sphere (20), of an ecliptic crown (31) fixed to a ring (21) also pivoting about the globe axis (8), of a drive motoreducer (39) for driving either the ecliptic crown in rotation in the backward direction or the celestial sphere (20) in the direct direction thereby evidencing the referential change and renewing the relationship between apparent motions and real motions. The didactic method implements an observer represented by a figurine (3) placed at the center of the horizon disc (1) itself traversed by the integral axis (8) at 90° of a cardinal axis allowing to sweep during its rotation a virtual plane with a north-south orientation within the ecliptic crown (31). The invention relates to uses of didactic equipment and to the representation of astronomical, physical and chemical phenomena, the professionals concerned by the astronomical phenomena and the periods of sunshine: farmers, architects and town planners, astrologers, chronobiologists, cosmologists, seamen, oyster farmers, landscape-gardeners, marine biologists, etc.

12 Claims, 8 Drawing Sheets

APPARATUS AND DIDACTIC METHOD FOR TEACHING AND SHOWING PRIMARY ORBITAL PHENOMENA AND VARIOUS MOVEMENTS

BACKGROUND OF THE INVENTION

I. Field of the Invention

The invention pertains to apparatuses and a method to teach and show orbital phenomena and various movements studied in astronomy, physics and chemistry, and especially for the purpose of explaining and conducting experiments on how the relationship between apparent and real movements evolves when reference systems are changed, as a function of the properties of said reference system and the movements affecting it.

II. Description of Related Art

It is known that many armillary spheres propose static and dynamic representations of the solar system alone that are not in accordance with current astronomic data. It is known that some armillary spheres are more faithful to said data, but at the price of conventions and abstractions that misconstrue perceptible astronomic data that may be seen by a human viewer located somewhere on the surface of the earth (as a first example, the earth is reduced to a virtual point located at the center of the sphere, with the observer himself being reduced to an eye placed in said center; as a second example, the local horizon plane from which the observer is supposed to make his observation is by convention represented by a flat crown located on the periphery and outside of the sphere, which ensures that the terrestrial horizon would be outside of the terrestrial globe and even beyond the stars).

It is known that two-dimensional graphic representations show astronomic or physical phenomena, but that these representations are static, and do not allow adjustments, predictions or changes in point of view or reference system, nor do they allow reversible or progressive instruction.

It is known that planetariums implement optical mechanisms that allow astronomic phenomena to be represented. Unfortunately, said equipment is heavy, voluminous, very expensive and merely retrieves stored data.

On the one hand, the spectator passively watches a set presentation that reproduces only phenomena that can be observed in a night sky at a certain location on the earth at a given moment, the sky show being generated from a precise and thus topocentric horizon; on the, other hand, the spectator does not have a more complete, eccentric view of the movements and interactions in the solar system that can give him a better understanding of astronomy and, furthermore, of physics and chemistry, which planetariums do not cover.

SUMMARY AND OBJECTIVES OF INVENTION

The apparatus and the didactic method covered by said invention present the following advantages:

Correction of errors and shortcomings in prior didactic machines and methods;

Extension of possibilities for teaching, representing and understanding orbital phenomena to scientific disciplines other than astronomy, such as physics and chemistry;

Making predictions and measurements for most astronomic phenomena;

Changing from a topocentric view of celestial phenomena from the local horizon to an eccentric view of the earth on an overall basis, and observed, for example, from outside the ecliptic plane;

Understanding of the earth's rotation and revolving movements seen from the earth or from any point in space, in a static or dynamic system, with reversible animation giving access to predictions, comparisons, verifications, measurements, error and, consequently, personalized learning of phenomena considered to date as very dull;

Reconsideration of the relationship between apparent and real movements making it possible to eliminate the isolation between experienced astronomy from abstract learned astronomy.

Practical display of the globe of the earth on the local horizon plane;

Measurement of the meridian height of a star at any point on earth;

Measurement of local sun time at any point on the earth;

Measurement of longitude at any point on the earth;

Measurement of local sidereal time;

Definition of the location of sunrise and sunset at any point on the earth;

Measurement of the local latitude angle;

Practical representation of sunlight, its angle of attack on the local horizon plane and the shadow generated;

Practical representation of the apparent vertical course of the sun on the ecliptic plane;

Display of the time equation;

BRIEF DESCRIPTION OF THE DRAWINGS

Change of hemispheres by inverting the position of the poles; The invention is described in detail in the text below, with reference to the accompanying drawings provided as non-restrictive examples showing the following.

DESCRIPTION OF PREFERRED EMBODIMENTS

Figure 1:
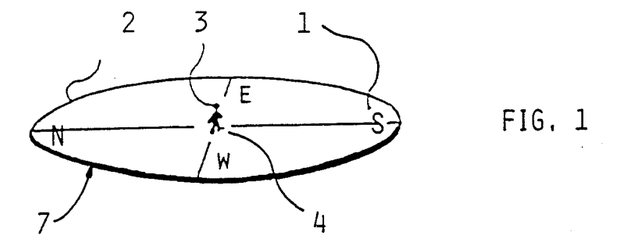
FIG. 1: Diagram of the horizon disk.

FIG. 1 shows a horizon disk whose two north-south and east-west oriented diameters define an intersection, which, in this case, is called the primordial center, said center being occupied by a humanoid figure in standing position and designed to pivot in said center from 0° to 360°, the periphery of the disk corresponding to the horizon line in astronomy.

Figure 2:
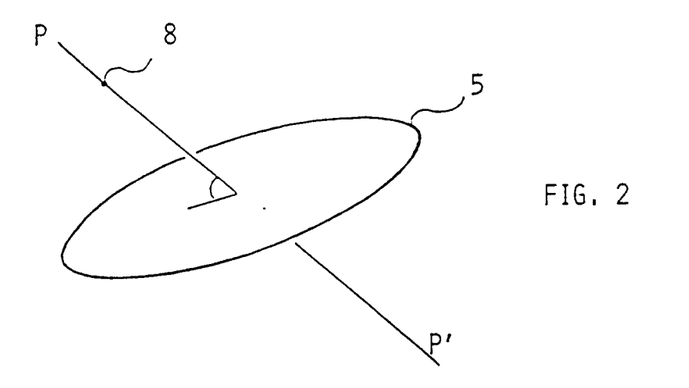
FIG. 2: Circular ring through which a primordial axis passes.

FIG. 2. shows an "eccentric" circular ring through which a primordial axis PP' passes at a characteristic angle.

Figure 3:
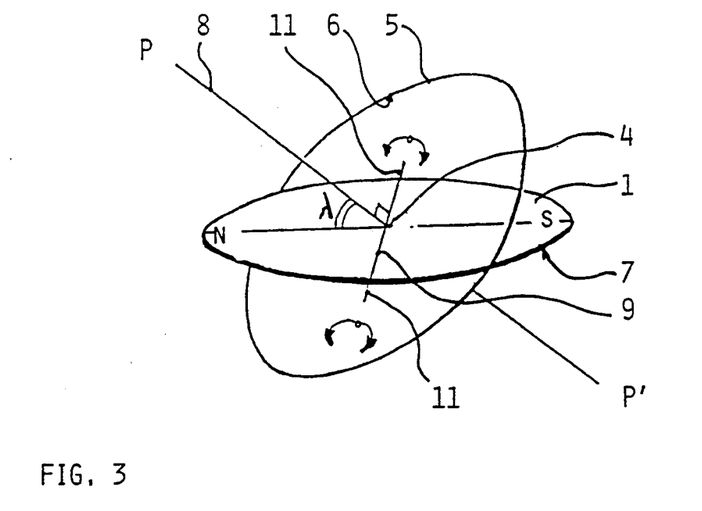
FIG. 3: Horizon disk in FIG. 1 surrounded by the ecliptic ring in FIG. 2.

FIG. 3 shows the horizon disk in FIG. 1 surrounded by the eccentric in FIG. 2, the outside edge of the disk being opposite the inside edge of the eccentric. The primordial axis at 90° with the cardinal axis included in the horizon disk plane at a characteristic angle with the horizon disk pivots around the primordial axis, protruding from the disk at both ends and thus scans a north-south oriented plane.

Figure 4:
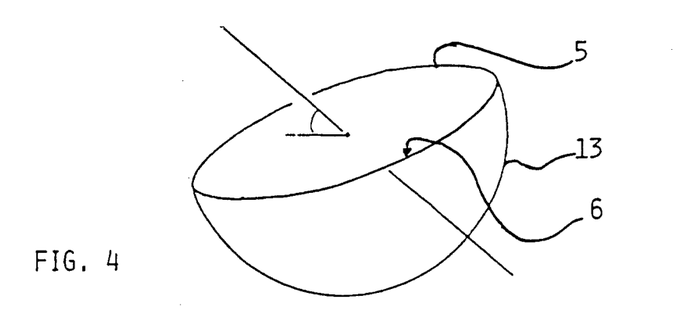
FIGS. 4, 5 and 6: Diagrams illustrating a simplified version of the apparatus.

FIG. 4 represents the virtual primordial axis formed by a first tubular shaft, rotating and solidary with the eccentric ring at a point through the use of a hoop making it possible to scan around the horizon disk with no obstructions.

Figure 5:
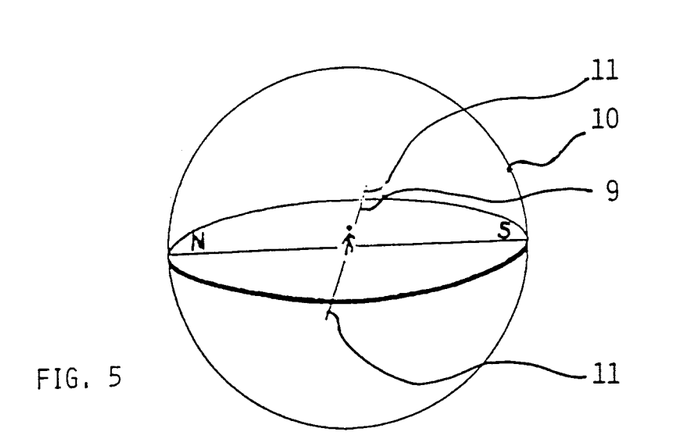

FIG. 5 shows a first transparent sphere called an inside sphere encompassing the horizon disk in FIG. 1, disk having a cardinal axis whose two ends are solidary with said sphere.

Figure 6:
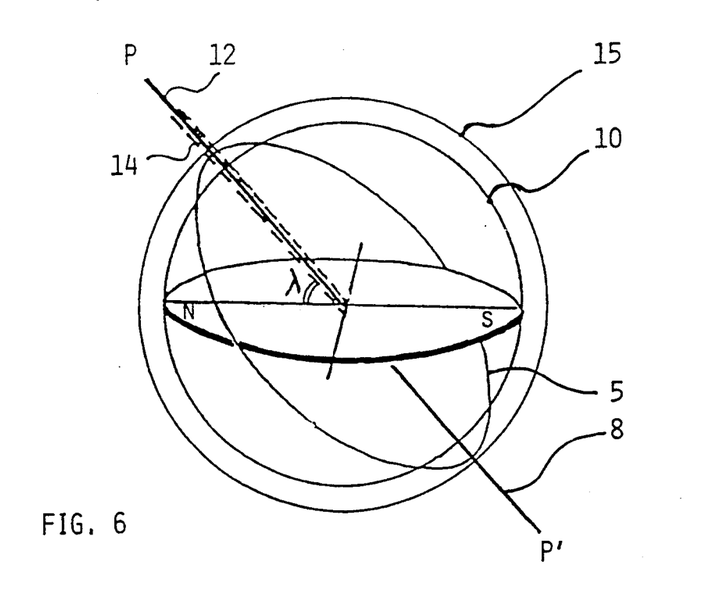

FIG. 6 shows a second transparent sphere known as the outside sphere encompassing the horizon plane, the inside sphere and the hoop of the eccentric. A second tubular shaft, rotating and solidary with the cardinal axis included in the horizon disk, [illegible] line of the axis coinciding with the primordial axis allowing the horizon disk to rotate on itself. Both shafts thus make it possible to move the eccentric and the horizon plane, in a reversible manner or otherwise, and as needed, separately or together The access opening to the eccentric and the opening of the inside sphere is not visible (after the two openings are aligned, it allows adjustment of the latitude angle of the horizon disk and introduction or removal of any required signs or objects).

Figure 7:
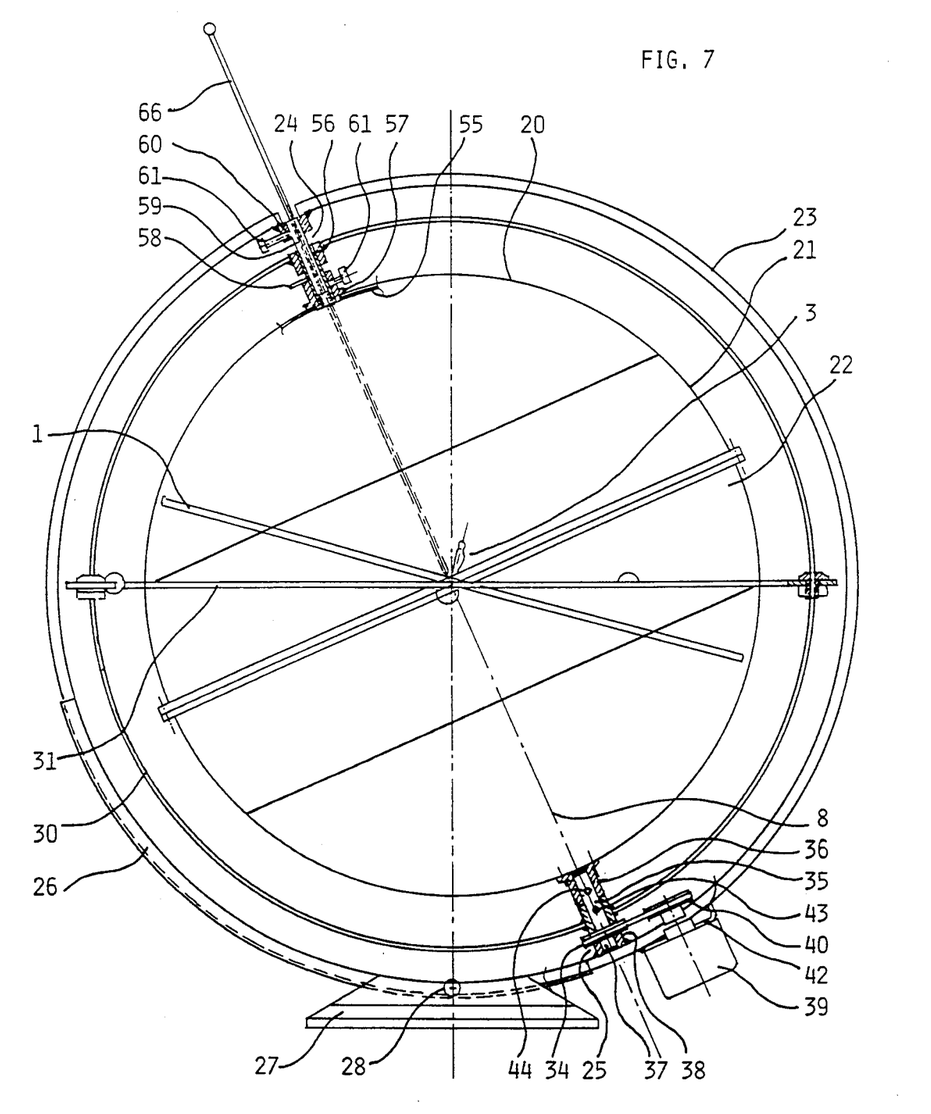
FIG. 7: Apparatus according to the invention, in which the rotation of the ecliptic ring is motorized.

FIG. 7 shows an example apparatus according to the invention, which, through various relative movements, makes it possible to illustrate the didactic method developed below.

Figures 16, 17, 18, 19:
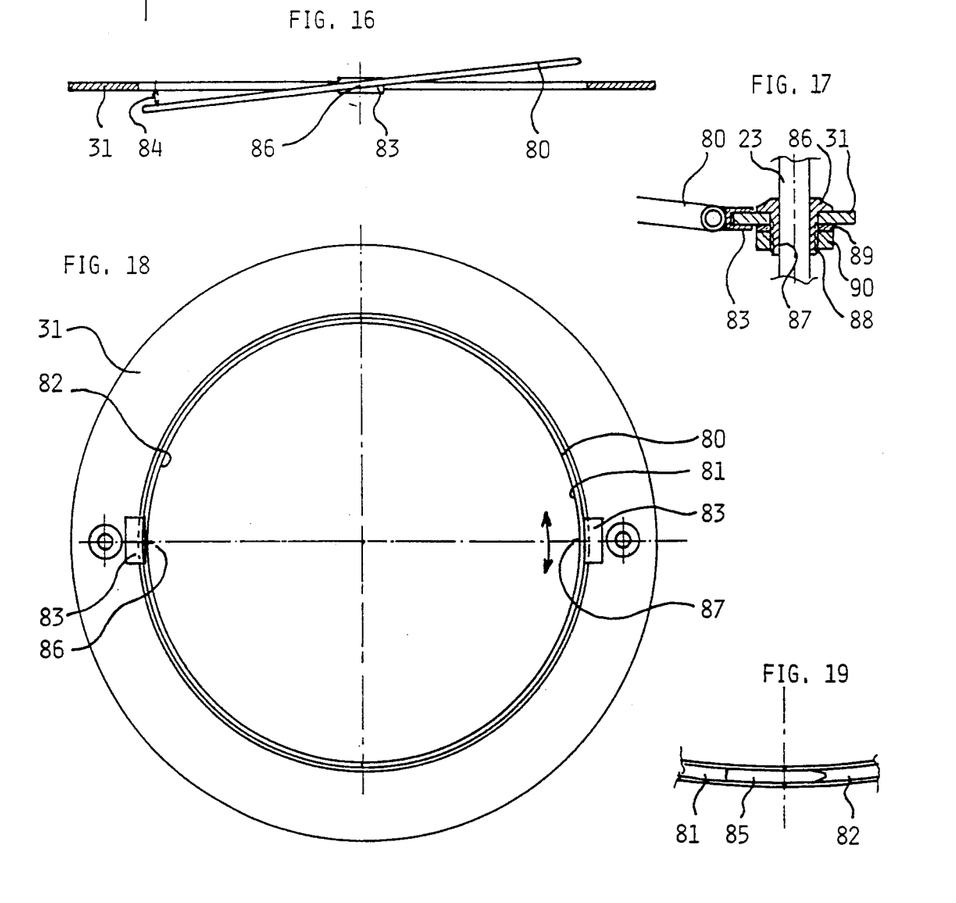
FIGS. 16, 17, 18 and 19: Adjustable-position hoop of the movements of the moon and embodiment details.

It comprises the following:

A local universal celestial sphere 20 made in two parts 21, 22, of transparent plastic material, respectively representing the northern hemisphere 21 and the southern hemisphere 22;

An outside support ring 23, cylindrical in section, to which is welded an upper pivot 24 and a lower pivot 25 of primordial rotation axis 8 of sphere 20; ring 23 is placed slidingly in a slide 26 solidary with a foot 27, immobilized using a knurled screw 28 in the position selected for a specific observation, northern hemisphere or southern hemisphere, because ring 23 makes it possible to reverse the position of the poles;

A second ring 30, cylindrical in section, acts as a support for a flat ecliptic ring 31 made in two half-parts to facilitate assembly, the details of which are shown in FIG. 17. Said ring 30 comprises an upper bearing 32 and a lower bearing 33 solidary with a pulley 34 making it possible to pivot around axis 8; it turns in its lower part on a shaft 35 engaged at its upper part in a bearing 36 fixed to sphere 20 along axis 8, its lower part 37 pivoting in a bearing 38 welded to ring 23.

A back-geared motor 39, on whose outlet shaft is mounted a pulley 40, drives pulley 34 in rotation by means of a belt 41 engaged in the corresponding groove of pulley 34. Said back-geared motor is attached to a support 42 welded to support ring 23; back-geared motor 39 makes it possible to drive either the ecliptic in the backward direction, or celestial sphere 20 in the forward direction in rotation by crossing belt 41 on the pulleys or reversing the rotational direction of the back-geared motor, in cooperation either with a fastening screw 43 screwed into bearing 33 to drive the ecliptic in rotation, or a screw 44 screwed into bearing 36 of sphere 20 to drive it in rotation.

Figure 8:
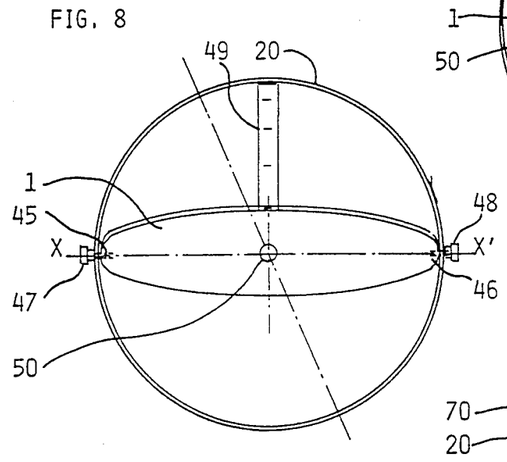
FIGS. 8 and 9: Detailed view of the horizon disk of the apparatus.
Figure 9:
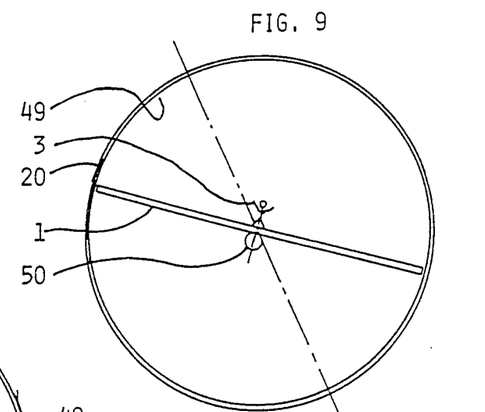

As shown in FIGS. 8 and 9, the immobilization of the sphere during the rotation, motorized or otherwise, of the ecliptic ring, or, conversely, by loosening said screws, makes it possible to turn sphere 20, while the ecliptic ring is immobile, which shows the difference between the real and apparent daily and annual movements of the sun. In this way, ecliptic crown 31 is made movable for the topocentric observer located at the primordial center of the local horizon disk, and the ecliptic crown is immobilized for the eccentric observer, and, by loosening screws 47, 48, the small ball 50 (FIGS. 8 and 9) representing the globe of the earth is made movable by turning the sphere. Said inversion will be more clearly understood with the supplementary apparatus shown in FIGS. 26 and 27.

Figure 12:
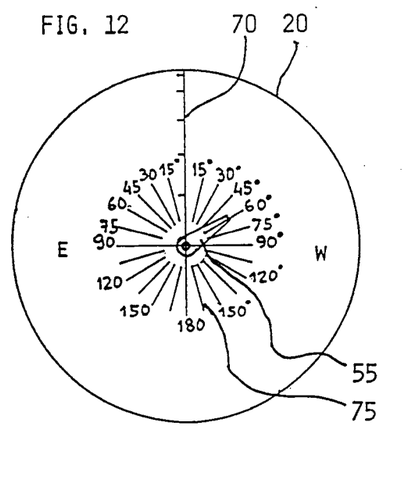
FIG. 12: EAST and WEST longitude graduation.

A horizon disk 1 shown on pivots 45, 46 each engaged in a corresponding bearing of sphere 20 whose rotation axis XX' embodies the east-west axis (FIGS. 8 and 9); the end of the pivots is threaded and each receives a nut button 47, 48 to control the disk inside sphere 20; a ribbon 49 made of transparent semi-rigid plastic material is fastened in a hoop against the north/south edges of disk 1 at right angles with the local meridian traced on the sphere, said ribbon 49 being graduated in latitude;

A small sphere 50 representing the earth is attached under local horizon disk 1 to the primordial center; the local horizon disk is tangent to said terrestrial sphere at a point whose latitude can thus be located visually using the north pole-south pole axis represented here by the primordial axis;

As shown in FIGS. 7 and 12, a longitude selection index 55, attached to the base of a tube 56 is engaged in upper bearing 57 of sphere 20 and in upper bearing 32 of ring 30, index 55 is oriented through the use of a small handle 58 whose end is screwed into an inside threading of tube 56 pressing against the top of bearing 57. A hollow axis 59 acting as a pivot is engaged in a bearing 60 welded to the inside of support ring 23; said ring 23 is open to allow pivot 59 to pass. Said arrangement simplifies the assembly of the ecliptic sphere/ring unit. Pivot 59 is locked on bearing 60 using a screw 61; a second screw 65 locks sphere 20 in cooperation with handle 58 locking pivot 59 to tube 56. A spring 62 was placed at the bottom of tube 59 to allow the pivot to be extracted if it is necessary to disassemble the sphere.

A straight shaft 66, passes through tubular body 56 of the index and moves forward to the primordial center. For the local observer, said shaft embodies the axis of the world, the direction of the polaris star and the latitude angle of the area formed between said shaft and the south/north direction traced on local horizon disk 1.

Figure 10:
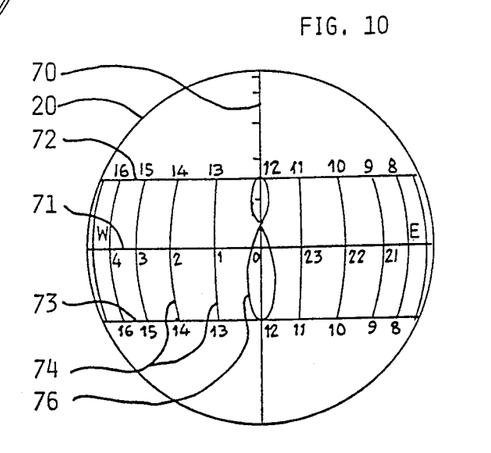
FIG. 10: Time grid circles of the sphere of the apparatus.

FIG. 10 shows a mechanism to measure local sun time embodied by three parallel circles traced on sphere 20, in this case, known as beginning-of-season circles, graduated into 24 equal parts (FIG. 11) indicating the times based on the local meridian: for example, a yellow circle 71 placed perpendicular to the primordial axis of the equator of the sphere, representing the local celestial equator as well as the trajectory of the sun during equinoxes [sic]. Said circle is graduated into 24 hours;

On both sides of said first circle, at 23°30' and parallel thereto, a red circle 72 was traced representing the trajectory of the sun during the summer solstice for the northern hemisphere and a blue circle 73 representing the trajectory of the sun during the winter solstice for the northern hemisphere. On these three circles, the hours are interconnected by 24 segments 74 of time circles perpendicular to the first three circles, yellow, blue and red. The time grid thus formed makes it possible to read the local sun time regardless of the latitude, day and the month of observation because the trajectory of the sun always cuts said grid. It primarily makes it possible to predict the rising and setting times of the sun, the moon and all of the planets in the solar system, regardless of the present, past or future time It makes it possible to find the length of the day and night immediately at any location on the earth and at any time. It also makes it possible to define where on the earth and on what dates it will be daylight for 24 consecutive hours or more.

The time equation has been traced on the sphere in the form of an infinity sign analogous curve between circles 72 and 73 of the two solstices, overmounting the local horizon meridian. Said curve gives a practical view of the difference between mean solar noon and true solar noon, i.e., to predict when the sun is ahead or behind in passing the local horizon meridian in comparison with legal mean noon.

Figure 11:
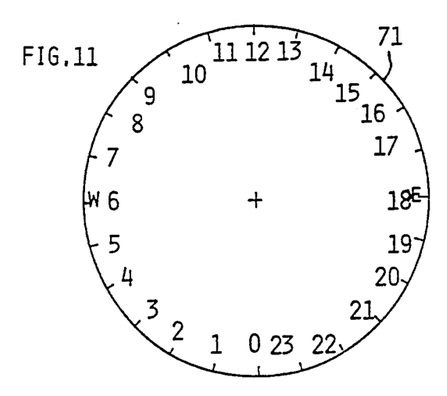
FIG. 11: Graduation of two beginning-of-season circles.

FIG. 11 shows the mechanism for measuring and showing local sidereal time. This is characterized by 24-hour graduations of the celestial equator (yellow circle) with a color other than the one used above for reading solar time. Said measurement is made by the correspondence of said graduation with a GAMMA index drawn on the zero degree of the ecliptic crown.

FIG. 12 shows a mechanism that makes it possible to select the longitude of the place of observation. Graduations 75 have been drawn on sphere 20 around the north pole, 180° EAST and 180° WEST. Index 55 (FIG. 12) placed against the inside wall of sphere 20 solidary with its adjustment tube 56 placed on the primordial axis is designed to be immobilized using a screw 65, either on the local meridian or on the Greenwich meridian. Said device makes it possible to measure the time difference between two points on the earth selected at will.

Figure 13:
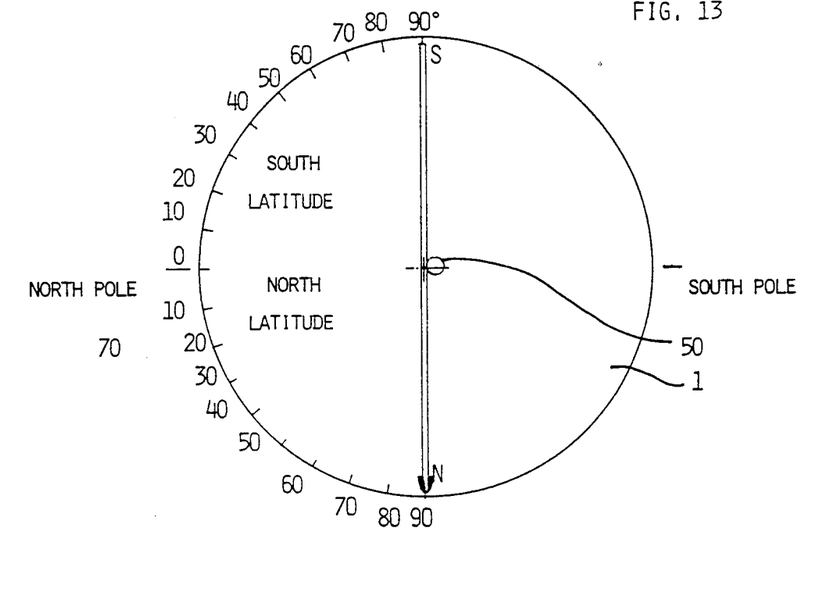
FIG. 13: Graduation indicating the latitude on the local meridian.

FIG. 13 shows the graduations indicating the latitude on the local meridian, identified in north latitude and south latitude.

Figure 14:
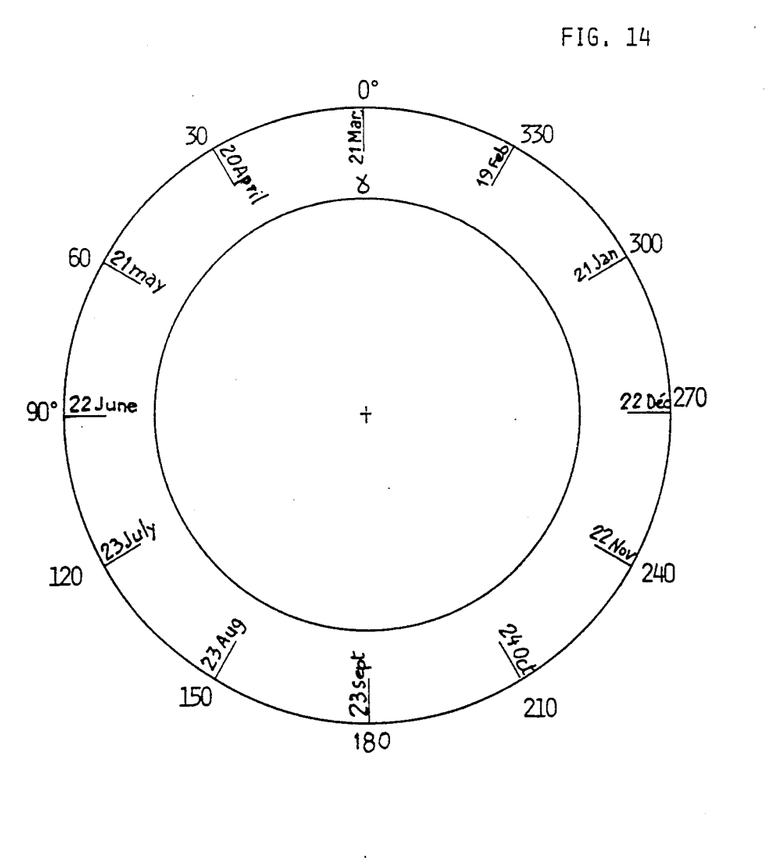
FIG. 14: Graduation of the ecliptic ring.

FIG. 14 shows the ecliptic crown 31 from a top view graduated into twelve equal divisions from 0° to 360° and bearing the characteristic dates of the sun's position as well as the GAMMA point or equinox point, together at 0°.

Figure 15:
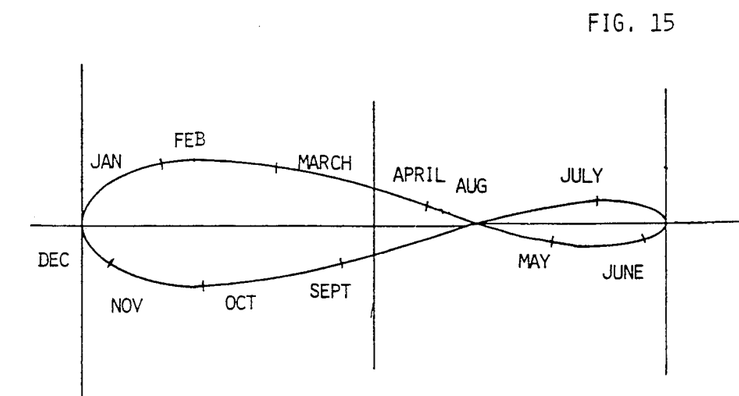
FIG. 15: Detail of the time equation shown on the celestial sphere of the apparatus.

FIG. 15 is a detailed view of the curve defining the time equation, whose position on sphere 30 is represented in FIG. 10. The time equation varies little from one day to the next. It is canceled out four times per year, on Apr. 15, Jun. 14, Sep. 1 and Dec. 25. The greatest differences between mean noon and true noon are observed on Feb. 11 and Nov. 3, when they are respectively +14 mn 23' and −16 mn 22'.

FIGS. 16, 17, 18 and 19 show a ring 80 which precisely reports lunar movements. This is done through the use of a tube cut into two equal parts 81, 82 each welded in the center to a small U-shaped slide 83 engaged on the inside edge of ecliptic crown 31, along an angle 84 of approximately 5°. The two half-parts of tubular ring 80 are secured together by two small pins 85, for example, made of plastic material, engaged in the ends opposite each other (FIG. 19). Ring 80 cuts ecliptic crown at two points 86, 87 which form lunar nodes and whose positions can be adjusted at their own rate.

Said device allows a precise tracking of the movement of the moon through the sky and prediction and display of the eclipse mechanism. Said information is important, especially in biodynamic agriculture and for calculating tides (tides are theoretically high when the moon passes over the meridian of the location. Spring tide periods take place when the moon and sun are either in conjunction or in opposition, i.e., at 180°; neap tide periods occur when the moon and the sun are in quadrature, i.e., at 90° angles with each other).

FIG. 17 also shows an example of the assembly of the two parts of the ecliptic crown on support ring 23, using at least one sleeve 86 comprising a bore 87 whose diameter takes into account the curvature of the ring to which it is engaged before the bearings are welded, a wide support head on the top of crown 31 and a threaded bearing area 88 engaged in two half-holes of the two parts of the crown, assembled using a washer 89 and a nut 90.

Figure 20:
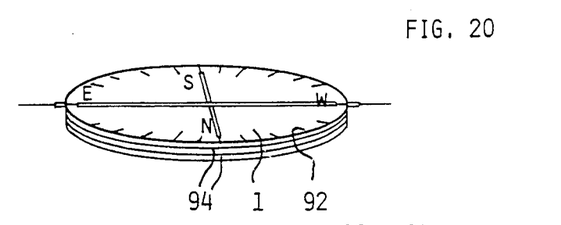
FIGS. 20, 21, 22: Detailed view of the mechanism to measure the variable length of twilight.
Figures 21, 22:
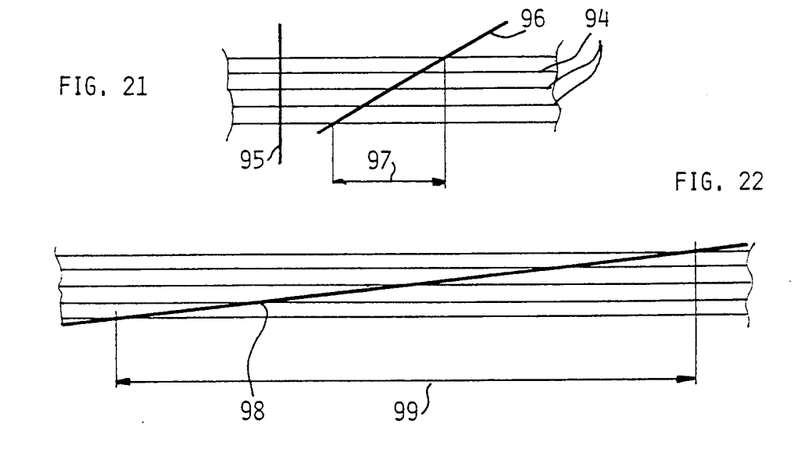

FIG. 20 shows a mechanism to define, at any place on the earth, the location of the "rising and setting" of the sun and any of the stars in the solar system. For said purpose, graduations 92 have been drawn in degrees on the periphery of local horizon disk 1. Measurement is done in north or south degrees azimuth FIGS. 20, 21 and 22 show a mechanism to display the duration of twilight at any location on the earth and at any time, characterized in that horizon disk 1 is endowed with a thickness on which is traced several circles parallel to the surfaces of the disk, in this case, known as twilight circles. The intersection of the horizon circle with the time grid indicates the onset of twilight; the intersection of a selected twilight circle yields the end of the corresponding type of twilight: civil, astronomic, nautical. The trajectory of the sun is provided as an example in thick lines: The trajectory 95 of the sun at the equator is vertical; the transition from day to night at that location is consequently very short, approximately 15'; in Example 96, the sun's trajectory is inclined 60°, and the length 97 of the twilight is relatively long; gradually as its trajectory inclines 98, length 99 increases. Said arrangement makes it possible to show clearly and understand said concept, which is difficult to perceive in abstract terms.

Figures 23, 24:
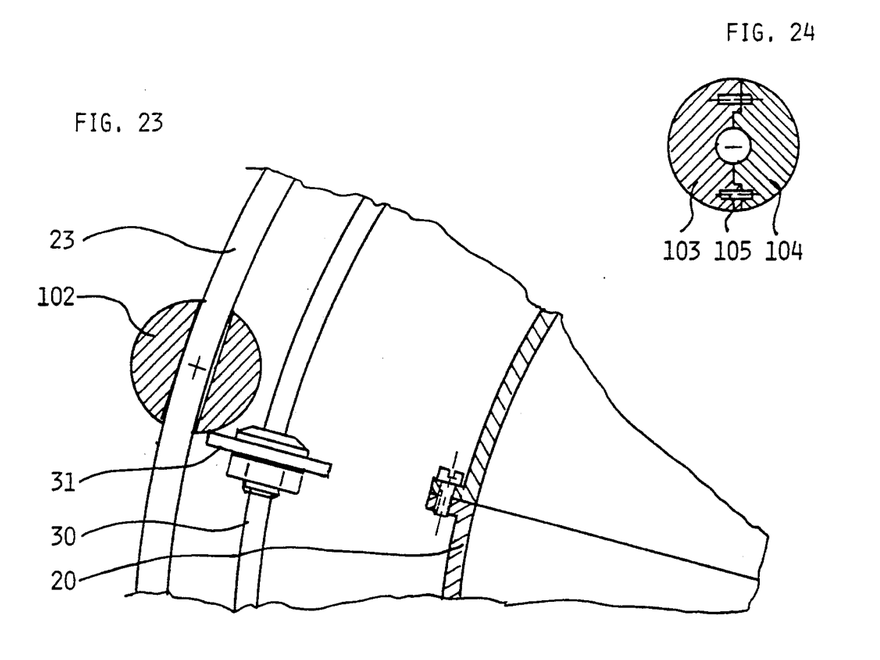
FIGS. 23 and 24: Mechanism to display the vertical path of the sun on the local meridian in comparison with the ecliptic ring.
Figure 25:
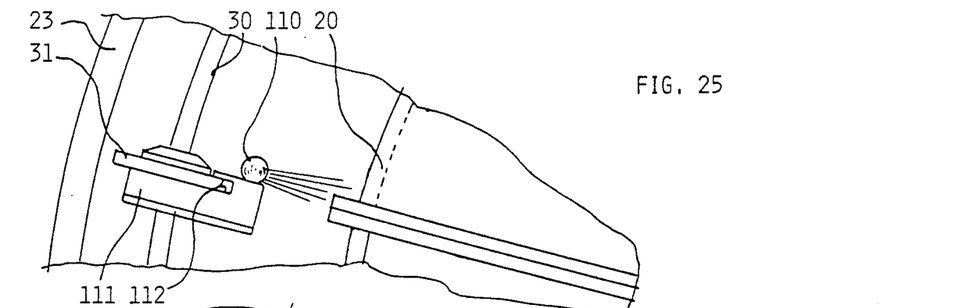
FIG. 25: Mobile light source on the ecliptic ring.

FIG. 23 shows a mechanism for displaying the ascending and descending movement of the sun in the meridian plane every day at noon throughout the entire year. Said mechanism consists of a small ball 102 sliding on support ring 23 of the primordial axis of sphere 20 placed concentrically with and outside of the local horizon meridian, and rolling on ecliptic crown 31. Said movement makes it possible, in a single rotation of the ecliptic crown, to display the rising and setting movement of represented by ball 102 between the two solstices (circles 72, 73 FIG. 10) and to pinpoint the precise moment and point at which the sun changes direction on its annual course. The small ball 102 is preferably made of plastic material in two parts 103, 104 (FIG. 24) held together by two slugs 105 shrunk by force into one of the two parts and fastened to the second to facilitate their positioning. FIG. 25 shows a device to illustrate the concept of day, night and the seasons. Said device consists of placing a localized light source 110 representing the sun on the inside edge of the ecliptic crown 31. It consists of a small electric bulb fed by a small, adequate and interchangeable electric battery placed in a housing 111 made of plastic material. Said housing comprises a slide 112 fastened with slight pressure to the inside edge of the crown of ecliptic 31, said slide making it possible to move the "sun" over the entire length of said crown. When said light source is above horizon disk 1, and sheds light on it, it is "DAYTIME;" when said source is occulted by the horizon disk, it is "NIGHTTIME;" it remains above the horizon disk for longer or shorter periods; it is higher or lower, which provides a practical illustration of the concept of the seasons.

Said light source faithfully reproduces the shadows generated by the sun and their evolution throughout the day and during the year. It makes it possible to read the local sun time on a sun dial placed at the primordial center of the device, according to the shadow produced by said source. Moreover, the comparison between the real shadow produced by the sun at time "t" and the shadow produced by the light source of the apparatus makes it possible to determine the date and time, or the latitude and place of observation.

Figure 26:
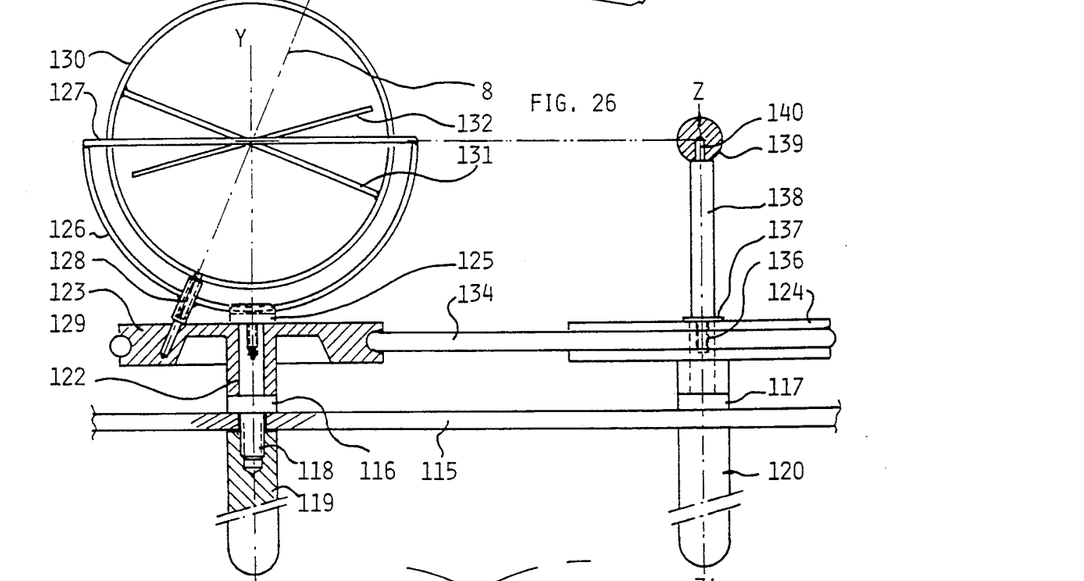
FIGS. 26 and 27: Mechanism for changing topocentric/eccentric reference systems and the position of the primordial axis of the earth in its rotation around the sun and vice versa
Figure 27:
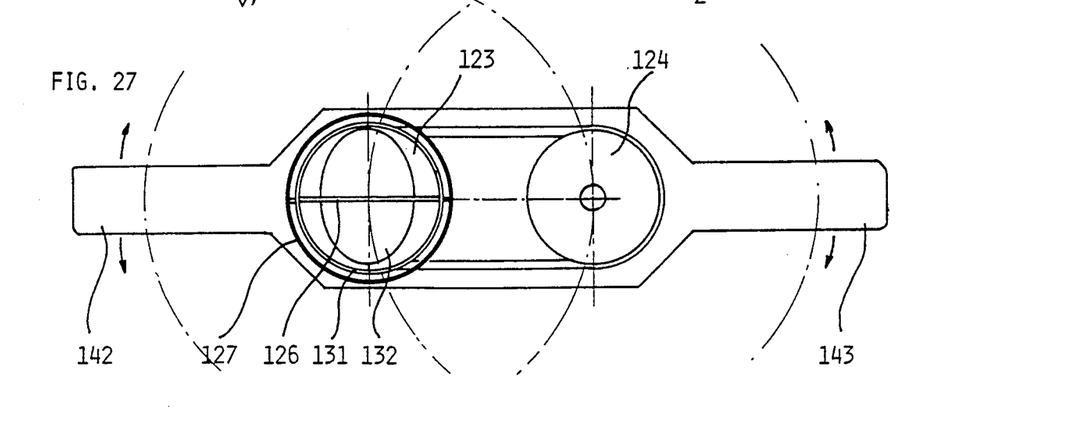

FIGS. 26 and 27 show a means of simultaneous representation either of real movements (seen exocentrically), i.e., the rotation of the earth around its axis in 24 hours and the revolution of the earth around the sun in one year, or apparent movements (seen topocentrically), i.e., the path of the sun around the earth in 24 hours and the path of the sun on the ecliptic in one year.

It comprises a support plate 115 on which two shouldered axes 116, 117 have been mounted, one YY' showing the position of the earth and the other ZZ' showing the position of the sun; each of said axes comprises a threaded bearing surface 118 to which is screwed to the root of the threading handles 119, 120 leaving a slight clearance between plate 115 and handle 119, 120, allowing them to rotate. Axes 116, 117 each comprise a bearing surface 122 to which is engaged a rounded-groove pulley 123, 124 locked in rotation by a screw 125 endowed with a large head wherein a milled groove serves as a guide for a half-ring 126 to which a second ring 127 representing the ecliptic is welded; to the base of half-ring 126 is welded an axis 128 endowed with a bearing surface engaged in a hole placed in pulley 123 inclined along primordial axis 8, said axis containing a hole acting as a bearing for an axis welded under a ring 130 supporting an equatorial ring 131 perpendicular to primordial axis 8 on two hinges from which a local horizon disk 132 pivots.

Pulleys 123, 124 are driven in synchronism by a belt 134. Pulley 124 is made unitary with axis 117 by a screw 136 whose head 137 is extended by a shaft 138 the free end of which accommodates a small ball 139 representing the sun, fastened to a shouldered bearing surface 140. Shafts YY' and ZZ' are spaced so that small ball 139 representing the sun moves close to ecliptic ring 127. Plate 115 protrudes on each side beyond the pulleys through handles 142, 143. When vertical handle 119 is held while pushing on handle 143, the apparent movement of the sun revolving around the earth is observed. When vertical handle 120 is held while pushing on handle 142, the real movement of the earth around the sun is observed. Said method of representation makes it possible to understand how apparent and real movements reverse when the reference system (topocentric or exocentric) is changed.

Said method also demonstrates the fact that the earth's axis 8 remains parallel to itself while the earth revolves around the sun, which is a highly abstract phenomenon that defies any dynamic representation.

As mentioned in the description of FIG. 7, to facilitate the observation of astronomic phenomena that can be observed in the southern hemisphere, support ring 23 slides in a slide 26 wherein it can be locked in any position for the purpose of orienting the entire device along the most favorable angle for the users. The most favorable angle, for example, for an exocentric observer watching the earth rotate on itself corresponds to the horizontal and immobile ecliptic crown. The device makes it possible to observe the progressive passing from the northern hemisphere to the southern hemisphere and to display the progressive transformation of the manifestations of the different celestial phenomena, in their form as well as in the areas in which they occur, for example, the reversing of different lunar phase figures, constellations of the zodiac, the rising and setting of different stars.

The didactic method for teaching and displaying orbital phenomena and various movements studied in astronomy, physics and chemistry utilizes a local horizon plane of the planet or the secant plane of the nucleus formed by a local horizon disk 1 whose periphery corresponds to the horizon line (2) that can be seen by an observer located in its center, said "topocentric" observer being advantageously embodied by a humanoid figurine (3) in standing position and able to pivot 360° on itself. The primordial center 4 of said disk 1 is embodied by the intersection of the two perpendicular diameters whose ends shown on the disk indicate the orientation, for example, of the cardinal points: north-south; east-west. Said horizon disk is designed to accommodate signs, graphics or objects embodying astronomic or topographic concepts such as azimuth graduation, the meridian of the location, compasses, the celestial equator or physical and chemical concepts such as the nucleus, electron, etc. The ecliptic crown (31) may further be made of a material allowing figurines of stars to slide on its inside edge. The didactic method gives the student the ability to change observation reference systems, i.e., on the one hand, to identify with the aforementioned figurine and place himself in the position of an observer of the phenomena shown in the celestial, physical or chemical visual field, above the local horizon plane, and, on the other hand, not to identify with said figurine so as to have access to a different view of the system studied.

The didactic method advantageously uses an orbital plane embodied using an "eccentric" circular ring 5 distinguished by its inside edge 6 representing an orbit, for example, the ecliptic, and located opposite outside edge 7 of horizon disk 1, distinguished by the ability of said ring to be endowed with various signs or objects representing celestial bodies, nuclei, electrons, particles, or scientific information such as the equinox point, graduations, signs of the zodiac, etc., distinguished finally by the ability of said ring to become unitary with either a flat crown more broadly representing the orbital plane (for example, the plane of the ecliptic); with a full sphere advantageously holding stars, electrons, particles, etc.; or with a spherical zone representing a segment of a sphere (for example, the zodiac strip in a celestial sphere). Said zodiac strip is preferably made of transparent plastic material mounted on the outside edge of ecliptic crown 31 using a slide 86 (FIG. 17). The relative movement of said strip around the crown occurs in 26,000 years and shows the staggering of the zodiac signs with the constellations of the same name.

The didactic method advantageously uses a first virtual axis called primordial axis 8PP' corresponding, for example, to the earth's axis in astronomy, distinguished by the fact that it passes through the center of eccentric ring 5 forming a fixed angle characteristic of the initial location of topocentric observation, for example, an angle of 66°30' for an observer located on a terrestrial horizon plane), distinguished by the fact that it passes through the center of horizon disk 4 forming an angle that can be varied and adjusted as needed, and which always remains within the plane perpendicular to the horizon disk along the north-south orientation line, distinguished by the fact that the center of eccentric ring 5 and the center of horizon disk 4 coincide on it, distinguished by the fact that it indicates in sense P the direction of the north-south pole (for example, the north celestial pole shown by the polaris star).

The didactic method advantageously uses a second virtual axis known as cardinal axis 9, distinguished by the fact that it is contained in the horizon disk and that it coincides with the east-west orientation line of the same disk, distinguished by the fact that primordial axis 8 is perpendicular to it, that their intersection coincides with primordial center 4, and that horizon disk 1 can pivot around it, just as with primordial axis 8.

The didactic method advantageously uses a meridian plane of the horizon disk embodied by the scanning of the line of primordial axis 8 in its rotation around the line of cardinal axis 9. The didactic method advantageously uses the latitude of the horizon plane (for example, of the local horizon plane in astronomy) embodied by the angle formed by the line of the primordial axis with the north-south orientation line of the horizon disk.

In the didactic method, eccentric ring 5 can to be used as a track for the orbital displacement of various bodies such as electrons, or, for example, the sun, moon and planets in astronomy.

The didactic method advantageously uses a virtual spherical zone embodied, for example, through the scanning of the aforementioned eccentric ring during a rotational movement around the primordial axis, thus offering the topocentric and immobile observer 3 on horizon plane 1, itself immobile, the representation of orbital movements, for example, revolution movements of the planets shown on eccentric ring 5 making it possible, for example, to use said method in astronomy to show the phenomenon of day, night and the seasons.

The didactic method advantageously uses a partial occultation of eccentric ring 5 obtained by the scanning of horizon disk 1 during its rotational movement around primordial axis 8, making it possible, for example, to represent the phenomenon of day and night in astronomy at any location and during any season.

The didactic method advantageously uses a first transparent sphere known as inside sphere 10 which encompasses horizon disk 1 whose diameter is almost equal to that of the sphere, horizon disk 1 thus encompassed having a cardinal axis 9 whose two ends 11 are unitary with said sphere 10. Virtual primordial axis 8 of the inside sphere is embodied by a first tubular shaft 12, rotating and solidary with eccentric ring 5 in at least one point, using any means allowing the unobstructed scanning around the horizon disk (for example, one or more hoops 13).

A second rotating tubular shaft 14 solidary with cardinal axis 9 included in horizon disk 1 and whose axis line coincides with primordial axis 8 allows the horizon disk to rotate on itself, inside sphere 10 possibly being endowed with an opening making it possible to use any means to adjust the latitude angle of horizon disk 1 and to introduce or remove any required signs or objects.

The didactic method uses a second transparent sphere known as the outside sphere 15, which encompasses the first sphere 10 having a larger allowing the free internal rotation of at least one eccentric ring 5. The first and second aforementioned rotating tubular shafts protrude outside of sphere 15 with optional double, simultaneous or independent setting into motion. The outside wall of the outside sphere can, in a temporary of permanent manner, be endowed with any required sign or object and may be endowed with an opening that can advantageously be aligned with the opening of the inside sphere, making it possible to use any means to adjust the latitude angle of the horizon disk and to introduce or remove any required sign or object, with respect to the inside sphere or one of the eccentric rings.

The outside sphere may advantageously be replaced with a support ring 23 holding the bearings of primordial axis 8.

The didactic method according to the invention makes it possible to teach and to represent in a progressive or degressive, static or dynamic, or even reversible manner, numerous orbital phenomena and various movements studied in astronomy, physics and chemistry. It makes it possible to make forecasts, verifications and corrections of errors; orbital phenomena can appear using manual or motorized animation, or can be immobilized in static position.

The didactic method according to the invention primarily concerns the manufacturers and users of didactic materials and representations of astronomic, physical and chemical phenomena, as well as various professionals dealing with astronomic phenomena: farmers, sailors, chronobiologists, astrologers, etc., and those who deal with sunshine architects, urban planners, landscaper gardeners, cosmologists, thalassotherapists, oyster growers, etc.

What is claimed is:

1. An apparatus for teaching and representing primary orbital phenomena including movements in astronomy, physics and chemistry, said apparatus comprising;
   a support ring (23) having a coaxial upper bearing (60) and a lower bearing (38);
   a second ring (30) supporting an ecliptic crown (31);
   said second ring (30) rotatably mounted within said support ring (23) and having a coaxial upper bearing (32) and lower bearing (33);
   a celestial sphere (20) rotatably mounted within said second ring (30) having a coaxial upper bearing (57) and lower bearing (36);

each said upper bearing (60, 32, 57) engaged to a coaxial hollow shaft (56);

each said lower bearing (38, 33, 36) rotatably engaged to a coaxial shaft (35);

a set screw (61) on said upper bearing (60) for fixing said ring (23) to said coaxial hollow shaft (56);

set screw means (43, 44) on each of said lower bearing (33) of said second ring (30) and said lower bearing (36) of said celestial sphere (20) for selectively fixing said lower bearing (33) of said second ring (30) or said lower bearing (36) of said celestial sphere (20) to said coaxial shaft (35);

motor means mounted on said support ring (23) for rotating said coaxial shaft (35) to selectively rotate said celestial sphere or said second ring (30) when either is engaged to said coaxial shaft (30) by said set screw means (43,44);

said ecliptic crown (31) made from material allowing figurines of stars to slide on its inside edge;

a longitude regulation index (55) rotatably engaged to said upper bearing (57);

a first end of a straight shaft (66) inserted through said coaxial hollow shaft (56) to the primordial center of said celestial sphere (20);

a second end of said straight shaft (66) having a small ball representing polaris;

means for inverting the position of the poles of said celestial sphere (20) comprising a slide (26) engaged to said support ring (23);

wherein, said celestial sphere having:

a first bearing and a second bearing on an equator of said celestial sphere perpendicular to a local meridian on said celestial sphere;

a local horizon disk (1) having a first pivot (45) and a second pivot (46) rotatably engaged in said first bearing and said second bearing of said celestial sphere (20);

control means (47, 48) engaged to said first pivot (45) and said second pivot (46) for selectively fixing said local horizon disk (1) in relation to said celestial sphere (20); and a small ball (50) fixed at a point on its surface under said local horizon disk (1) at a center of said local horizon disk (1).

2. The apparatus according to claim 1, comprising means for measuring a meridian height composed of a thin strip made of semi-rigid transparent material, attached to sides of said horizon disk (1) along a local meridian (70) engraved on said celestial sphere (20), said strip comprising graduations in degrees for north latitudes and south latitudes.

3. The apparatus according to claim 1, comprising means for measuring local sun time and sidereal time embodies by three parallel circles (71, 72, 73) placed perpendicular to a primordial axis (8), all said three parallel circles graduated into 24 solar hours; a center circle (71) of said three parallel circles representing the celestial equator and graduated into 24 sidereal hours; a GAMMA index traced at zero degrees on said ecliptic crown (31); hours interconnected on said three parallel circles by 24 perpendicular circle segments (74) that define a time grid, a curve on said celestial sphere (20) of an equation (76) overmounting the local horizon meridian between upper and lower circles (72, 73) of said three parallel circles representing the summer and winter solstices.

4. The apparatus according to claim 1, comprising means for measuring the longitude of the place of observation embodied by graduations (75) in 180° WEST and 180° EAST around the north pole, in that said graduations cooperate with said index (55) placed against the inside wall of said celestial sphere (20), in that said index (55) is arranged to be locked either on the local meridian or on the Greenwich meridian.

5. The apparatus according to claim 1, comprising means for defining the location of the rising and setting of the sun and of any star in the solar system, at any place and at any time, embodied by a graduation in degrees (92) on the periphery of said horizon disk (1), measurement being done in degrees azimuth north or south.

6. The apparatus according to claim 1, wherein the local latitude angle is embodied between said shaft (66) engaged in said hollow shaft (56) from the index to the primordial center and the SOUTH/NORTH direction traced on said local horizon disk (1).

7. The apparatus according to claim 1, comprising means for the practical embodiment of sunlight composed of a small electric light bulb (110) fed by a battery, placed in a housing (111) comprising a slide (112) engaged on the inside edge of said ecliptic crown (31).

8. The apparatus according to claim 1, comprising means to define the length of the various twilights, civil, nautical and astronomic, consisting of a gradation embodied by circles (94) traced on the thickness of said horizon disk (1) parallel to the surface of said disk, the duration corresponding to a length (95, 96, 97) of the trajectory of the sun between the corresponding circles.

9. The apparatus according to claim 1, comprising means for reporting movements of the lunar nodes consisting of a fixed ring (80) inclined 5° with respect to the plane of said ecliptic crown (31), on two slides (83) engaged on the inside edge of said ecliptic crown (31).

10. The apparatus according to claim 1, comprising means for embodying the vertical path of the sun inn the meridian plane every day at noon throughout the year composed of a small ball representing the sun, sliding on support ring (23) and rolling simultaneously on the top of said ecliptic crown (31), in that said ball is made in two assembled parts.

11. The apparatus according to claim 1, comprising means for embodying the passage from topocentric observation to eccentric observation comprising;

a support plate (115);

two pulleys (124), driven by a belt (134), separated so that a small ball (139) representing the sun, moves near the outside of an ecliptic ring (127) unitary with a support half-ring (126) comprising means of attachment to pulley (123), said half-ring (126) bbeing endowed with a bearing (128) inclined along said primordial axis (8), in which is engaged the pivot of a ring (130) unitary with a second ring (131) representing the celestial equator, to which is hinged to a local horizon disk (132);

handles (119, 120) each turning freely through plate (115);

handles (142, 143) placed on the ends of plate (115).

12. The apparatus according to claim 1, comprising two concentric spheres, a first, transparent inner sphere (10) of said two spheres, surrounds said horizon disk (1) said horizon disk equipped to rock in latitude in said first inner sphere (10), said first inner sphere pivoting on a first rotary tubular shaft (12) that is integrally attached to said ring (5, 30) which revolves without hindrance around said horizon disk, a rotary tubular shaft (14) integral with the axis (9, XX') of said horizon disk (1)

enabling the rotation of said horizon disk on itself, said inner sphere (10) provided with an opening enabling access by any means for adjusting the angle of latitude of said horizon disk (1) and enabling introduction or removal of any symbol or objects required, a second, outer transparent sphere (15) of said two spheres surrounding said first sphere (10) with a play enabling the free internal rotation of said ring (5, 30), said first rotary tubular shaft and a second rotary tubular shaft extended outside said outer sphere 15, to enable manually establishing relative simultaneous or independent motion of one and/or the other of said two spheres, that said outer sphere is provided with an opening aligned with the opening of said inner sphere, to allow access by any means for adjusting the angle of latitude of said horizon disk.

* * * * *